United States Patent [19]

Huh

[11] Patent Number: 5,884,479
[45] Date of Patent: Mar. 23, 1999

[54] DEVICE FOR MATCHING THE OPERATION OF TRAVELLING UNIT IN CONSTRUCTION VEHICLES

[75] Inventor: Tae Kyu Huh, Changwon, Rep. of Korea

[73] Assignee: Volvo Construction Equipment Korea Co., Ltd., Rep. of Korea

[21] Appl. No.: 762,953

[22] Filed: Dec. 10, 1996

[30] Foreign Application Priority Data

Jun. 29, 1996 [KR] Rep. of Korea ........................ 96-26082

[51] Int. Cl.[6] ...................................................... F16D 31/02
[52] U.S. Cl. ................................................ 60/431; 60/449
[58] Field of Search ............................... 60/431, 433, 449

[56] References Cited

U.S. PATENT DOCUMENTS

| | | | |
|---|---|---|---|
| 3,986,358 | 10/1976 | Hoffmann | 60/431 |
| 4,041,702 | 8/1977 | Habiger | 60/431 |
| 4,168,612 | 9/1979 | Nikolaus | 60/431 |
| 4,400,939 | 8/1983 | Moranduzzo et al. | 60/431 |
| 4,864,994 | 9/1989 | Myers | 60/431 X |
| 5,177,964 | 1/1993 | Tanaka et al. | |
| 5,239,249 | 8/1993 | Ono | |
| 5,529,134 | 6/1996 | Yomogita | |

*Primary Examiner*—John E. Ryznic
*Attorney, Agent, or Firm*—Harness, Dickey & Pierce, P.L.C.

[57] ABSTRACT

A device for matching the operation of a travelling unit in a construction vehicle is disclosed. The device reduces the required levering force of a travelling control pedal, easily controls the rotating force of an engine, and safely changes the engine output torque in accordance with both the levering stroke of the travelling control pedal and a travelling resistance. The device has a pressure reduction valve which is synchronized with a levering motion of a travelling control pedal in order to feed pilot fluid from a pilot pump to a direction select valve. A branch line is branched from a fluid line extending between the pressure reduction valve and the direction select valve. A hydraulic cylinder is connected to the branch line and selectively receives the pilot fluid through the branch line when the travelling control pedal is levered. A connection means is connected between a throttle lever of an engine and the hydraulic cylinder and moves the throttle lever of the engine in accordance with the displacement of the hydraulic cylinder, thereby controlling the number of revolutions of the engine.

4 Claims, 2 Drawing Sheets

DEVICE FOR MATCHING THE OPERATION OF TRAVELLING UNIT IN CONSTRUCTION VEHICLES

BACKGROUND OF THE INVENTION

1. Field of the Invention

The present invention relates, in general, to a device for matching the operation of a travelling unit in a construction vehicle and, more particularly, to a structural improvement in such a matching device for reducing the required levering force of a travelling control pedal, easily controlling the output power of an engine, and safely changing the engine output power and torque in accordance with both the levering stroke of the travelling control pedal and the travelling resistance, thereby effectively controlling the travelling unit during an operation of the construction vehicle.

2. Description of the Prior Art

A device, which simultaneously controls both a main hydraulic pump and an engine of a construction vehicle, such as a power excavator, by a levering stroke of a travelling control pedal, is known to those skilled in the art.

FIG. 1 shows the construction of the hydraulic system of a typical device for matching the travelling unit in a construction vehicle. As shown in FIG. 1, when both a travelling pedal 101 and a direction select valve 103 are handled by an operator during the operation of a construction vehicle, a pilot pressure output from a pilot pump 105 is applied to a directional control valve (travelling control valve) 109 associated with a travelling motor M through both a pressure reduction valve 107 and the direction select valve 103, thereby moving the spool of the travelling control valve 109 in either direction. Both the pressure reduction valve 107 and the direction select valve 103 are synchronized with a levering motion of the travelling pedal 101. When the spool of the travelling control valve 109 is moved in either direction by the pilot pressure, pressurized fluid output from a main hydraulic pump P is controllably fed to the travelling motor M through the valve 109, thus moving the construction vehicle to the front or back in accordance with a selected direction of the direction select valve 103.

In the above state, the levering force of the travelling pedal 101 is transmitted to a throttle lever 113 of an engine ENG through both a linkage 111 and a cable 115 thus increasing or reducing the number of revolutions of the engine ENG. The linkage 111 is coupled to the lower end of the travelling pedal 101, while the cable 115, extends from the linkage 111 to the throttle lever 113 of the engine ENG.

That is, the typical matching device controls both the travelling motor M and the engine ENG by a single levering motion of the travelling pedal 101.

However, the above matching device is problematic in that it has a complex construction, so that it is difficult to design and assemble. The complex construction increases the manufacturing cost and the complexity of the manufacturing process of the matching device. In addition, slack is generated in the linkage 111, so that it may fail to precisely control the engine ENG and travelling motor M.

In an effort to overcome the above problems, a device, which converts the levering stroke of the travelling pedal into a hydraulic force and moves the throttle lever of the engine using the hydraulic force, is known to those skilled in the art. Japanese U.M. Laid-open Publication No. Sho. 61-167440 (published on Oct. 17, 1986) and Korean U.M. Registration No. 95-06053 disclose examples of such a device.

In addition, Japanese U.M. Laid-open Publication No. Hei. 3-42855 discloses a device which has an improved construction and operational effect over those of the above Japanese and Korean devices. In the above-mentioned devices, a levering motion of a travelling pedal causes a secondary pressure, thereby directly controlling a travelling control valve, while a pump and engine are controlled by a signal operation means in response to the secondary pressure.

However, the above devices are problematic in that a slow return valve included in the devices is delicate to foreign substances, thereby often failing to return the travelling control valve to a neutral position. In the above state, the devices fail to stop the travelling unit due to a hydraulic resistance, thereby causing safety hazards even though the levering force is removed from the travelling pedal. In the above devices, the direction select valve must be returned to a neutral position when it is necessary to stop the travelling unit. That is, in order to stop the travelling unit, the direction select valve must be returned to the neutral position in order to return the pilot pressure of the travelling control valve to a return tank and to switch the travelling control valve into a neutral position. Therefore, the devices may cause safety hazards when the direction select valve is not controlled by an operator during the operation of a construction vehicle.

SUMMARY OF THE INVENTION

It is, therefore, an object of the present invention to provide a device for matching the operation of a travelling unit in a construction vehicle in which the above problems can be overcome and which reduces the required levering force of a travelling control pedal, which easily controls the rotating force of an engine, and which safely changes the engine output torque in accordance with both the levering stroke of the travelling control pedal and a travelling resistance, thereby effectively controlling the travelling unit during the operation of the construction vehicle.

In order to accomplish the above object, the present invention provides a device for matching the operation of a travelling unit in a construction vehicle, comprising: a pressure reduction valve synchronized with a levering motion of a travelling control pedal in order to feed pilot fluid from a pilot pump to a direction select valve, a branch line branched from a fluid line extending between the pressure reduction valve and the direction select valve, a hydraulic cylinder connected to the branch line and selectively receiving the pilot fluid from the pilot pump through the branch line when the travelling control pedal is levered, and a connection means connected between a throttle lever of an engine and the hydraulic cylinder and moving the throttle lever of the engine in accordance with displacement of the hydraulic cylinder, thereby controlling the number of revolutions of the engine.

The above matching device also includes a switch operating means, a limit switch and a controller. The switch operating means is mounted to the lower end of the travelling control pedal. The limit switch is operated by the switch operating means and converts a mechanical displacement of the travelling control pedal into an electric signal when the travelling control pedal is fully levered. The controller controls the engine in response to an electric signal output from the limit switch, thereby maximizing the number of revolutions of the engine.

An engine detecting means for detecting the number of revolutions of the engine is coupled to the engine. A proportional valve controls the amount of pressurized fluid output from the main hydraulic pump. The controller controls the proportional valve in response to a signal output from the engine detecting means, thereby controlling the pressurized fluid output from the main hydraulic pump and effectively controlling the travelling unit. In the above state, the controller safely changes the engine output power, engine output torque and travelling motor's rotating speed between two modes: a first mode in which the engine is free from a travelling resistance thereby generating the maximum output power and torque, and a second mode in which a travelling resistance acts on the engine, thereby reducing the output power and torque of the engine.

That is, in the case of the highest number of revolutions of the engine, the controller transmits all of the output power of the engine to the travelling motor, thereby moving the construction vehicle at the highest travelling speed. Meanwhile, when the number of revolutions of the engine is reduced due to a travelling resistance, the controller reduces the travelling speed of the vehicle, thereby preventing the engine from being unexpectedly halted.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
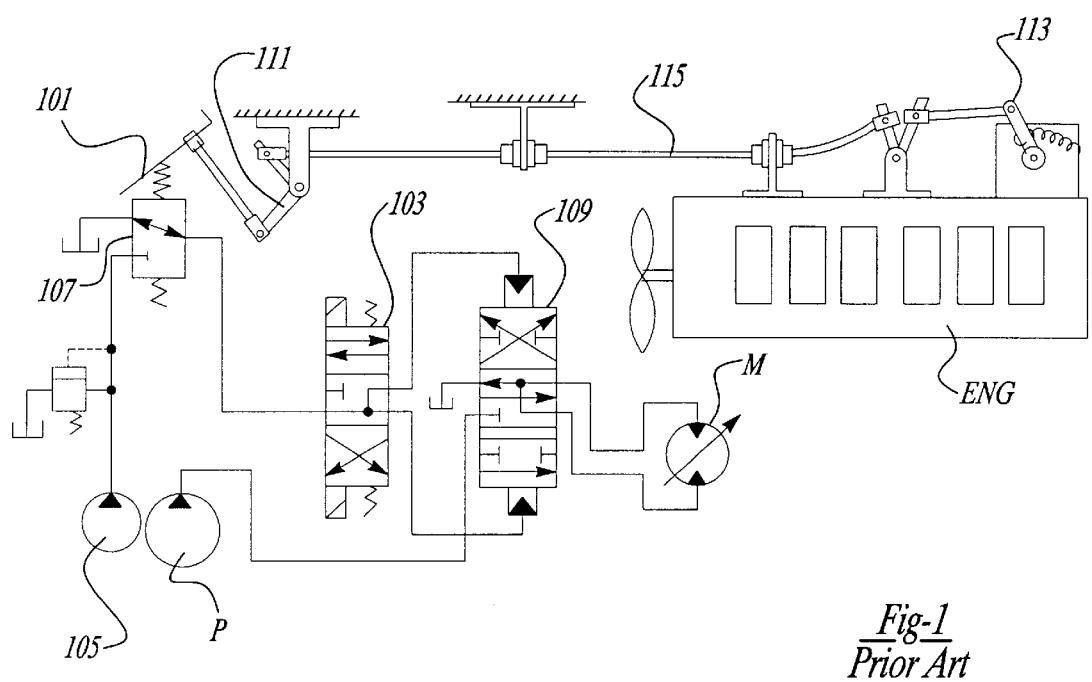
FIG. 1 is a circuit diagram showing the construction of the hydraulic system of a typical device for matching the travelling unit in a construction vehicle.
Figure 2:
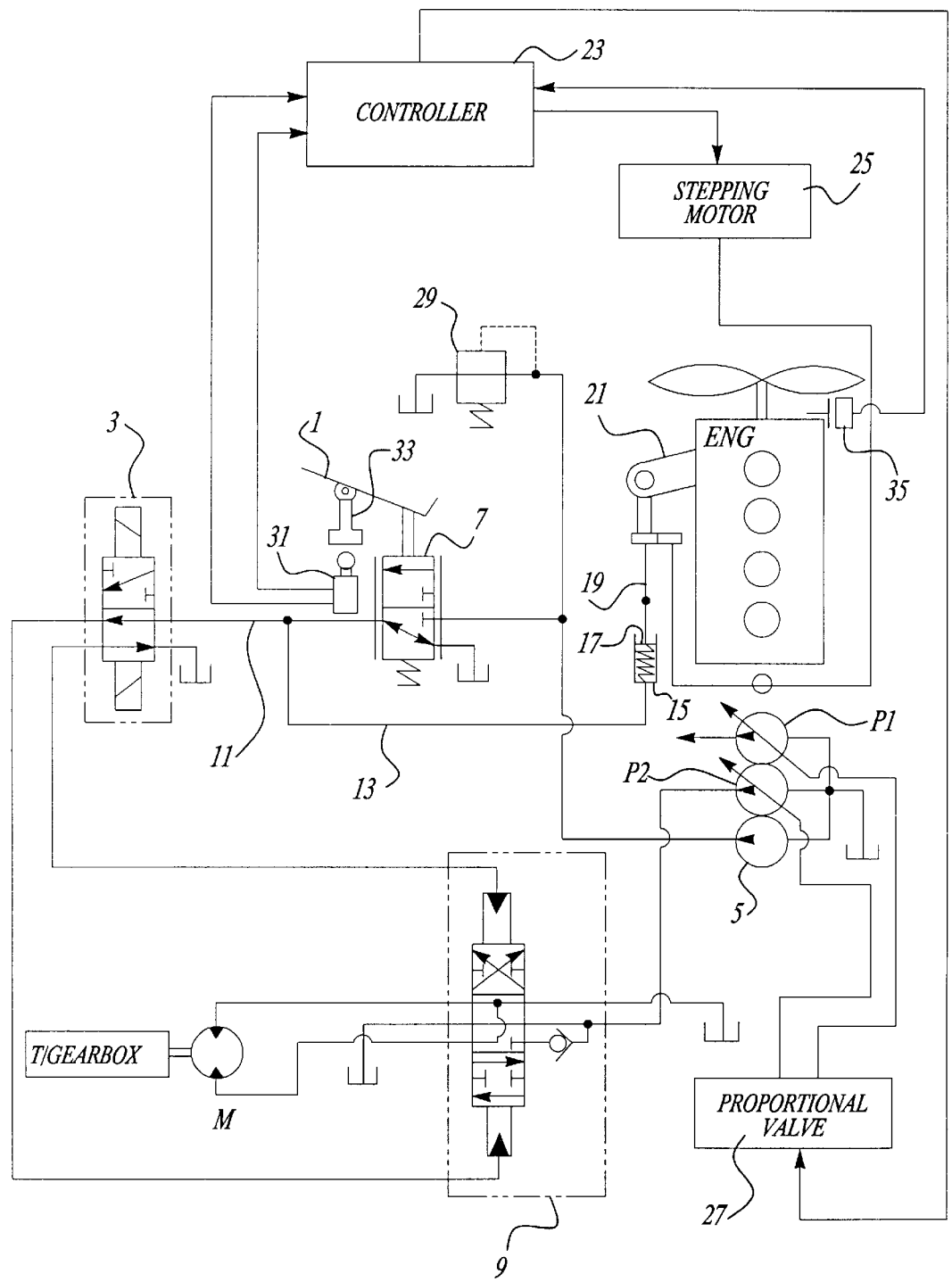
FIG. 2 is a circuit diagram showing the construction of the hydraulic system of a device for matching the travelling unit in a construction vehicle in accordance with the preferred embodiment of the present invention.

FIG. 2 is a circuit diagram showing the construction of the hydraulic system of a device for matching the travelling unit in a construction vehicle in accordance with the preferred embodiment of the present invention. In FIG. 2, the reference numerals 1, 3, 5 and 7 denote a travelling control pedal, a direction select valve, a pilot pump and a pressure reduction valve, respectively. In the matching device of this invention, the pressure reduction valve 7 is synchronized with a levering motion of the travelling control pedal 1 and feeds pilot fluid from the pilot pump 5 to the direction select valve 3. Two main pumps P1 and P2 are commonly connected to an engine ENG, while a travelling control valve 9, which is a directional control valve, is connected to a travelling motor M.

The matching device of this invention also includes a branch line 13 which is branched from a position of a fluid line 11 extending between the pressure reduction valve 7 and the direction select valve 3. A hydraulic cylinder 15 is connected to the branch line 13 and selectively receives the pilot fluid from the pilot pump 5 through the branch line 13 when the travelling control pedal 1 is levered. The cylinder 15 in the above state moves in proportion to the pressure inside the branch line 13. A connection means 19 is connected between the throttle lever 21 of the engine ENG and the hydraulic cylinder 15 and moves the throttle lever 21 of the engine ENG in accordance with the displacement of the hydraulic cylinder 15, thereby controlling the number of revolutions of the engine ENG. The above matching device also includes a switch operating means 33 and a limit switch 31. The switch operating means 33 is mounted to the lower end of the travelling control pedal 1. The limit switch 31 is operated by the switch operating means 33 in order to convert a mechanical displacement of the travelling control pedal 1 into an electric signal, when the travelling control pedal 1 is fully levered.

The limit switch 31 is electrically connected to a controller 23. The controller 23 controls the engine ENG in response to an electric signal output from the limit switch 31, thereby controlling the number of revolutions of the engine ENG.

The controller 23 is connected to an engine detecting means 35, which is coupled to the engine ENG and detects the number of revolutions of the engine ENG. A stepping motor 25 is connected to the controller 23 and operates the throttle lever 21 of the engine ENG. The stepping motor 25 is controllably operated in accordance with the number of revolutions of the engine ENG in order to operate the throttle lever 21.

A proportional valve 27 is connected to the two main pumps P1 and P2 and is controlled by an output control signal of the controller 23, thus controlling movement of the valve plates of the main pumps P1 and P2 and thereby regulating the output power of the engine ENG.

In FIG. 2, the reference numeral 29 denotes a relief valve, which maintains a constant pressure inside the hydraulic system.

The operational effect of the matching device will be described hereinbelow.

In the operation of the matching device of this invention, the controller 23 receives an electric signal output from the limit switch 31 and outputs a current control signal to the stepping motor 25, thereby rotating the engine ENG at the highest number of revolutions in the following manner. Upon receiving the current control signal output from the controller 23, the stepping motor 25 is started in order to fully operate the throttle lever 21 of the engine ENG, thereby causing the engine ENG to generate maximum output power. The controller 23 also outputs an electric signal to the proportional valve 27, so that the valve 27 controls the valve plates of the main pumps P1 and P2 in order to transmit all of the output power of the engine ENG to the travelling unit, thereby moving the construction vehicle at the maximum travelling speed.

When the travelling resistance is increased and thereby reduces the number of revolutions of the engine ENG, the change of the number of revolutions of the engine ENG is detected by the engine detecting means 35. The engine detecting means 35 in the above state outputs an electric signal, which is indicative of the change of the number of revolutions, to the controller 23. The controller 23 controls the proportional valve 27 in response to the signal output from the engine detecting means 35, thereby controlling the amount of pressurized fluid output from the main pumps P1 and P2 and reducing the travelling speed of the construction vehicle. The controller 23 thus safely changes the engine output power, engine output torque and travelling motor's rotating speed in accordance with the travelling resistance and thereby preventing the engine ENG from being unexpectedly halted. That is, the matching device of this invention controls the travelling unit of the construction vehicle in either of two modes: a first mode, in which the engine ENG, is free from a travelling resistance, thereby maximizing the output power and torque, and a second mode, in which a travelling resistance acts on the engine ENG thereby reducing the output power and torque of the engine ENG.

As described above, the present invention provides a device for matching the operation of a travelling unit in a construction vehicle. When a travelling control pedal is fully levered, the matching device moves the construction vehicle at a maximum travelling speed. Meanwhile, when the travelling control levers are not fully levered while simultaneously operating the construction vehicle before the limit switch is operated, the matching device appropriately controls the output power of the engine in a normal operational mode, thus lengthening the expected life span of the engine.

The matching device of this invention effectively prevents safety hazards caused by the malfunction of a slow return valve. The device also uses a hydraulic cylinder, of which the moving stroke is in proportion to a proportional valve's pressure that is changed by the stroke of the travelling control pedal, thereby reducing the required levering force of the pedal and improving work efficiency during the operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for matching the operation of a travelling unit in a construction vehicle, comprising:

a pressure reduction valve synchronized with a levering motion of a travelling control pedal in order to feed pilot fluid from a pilot pump to a direction select valve;

a branch line branched from a fluid line extending between said pressure reduction valve and said direction select valve;

a hydraulic cylinder connected to said branch line and selectively receiving the pilot fluid from the pilot pump through the branch line when the travelling control pedal is levered;

connection means connected between a throttle lever of an engine and said hydraulic cylinder and selectively moving said throttle lever in accordance with the displacement of said hydraulic cylinder, thereby controlling the number of revolutions of said engine; and controlling means for controlling the output torque of said engine in accordance with both the levering of the travelling control pedal and a travelling resistance of the construction vehicle.

2. The matching device according to claim 1, wherein said controlling means includes:

switch operating means mounted to a lower end of said travelling control pedal;

a limit switch selectively operated by said switch operating means in order to convert a mechanical displacement of said travelling control pedal into an electric signal, when the travelling control pedal is fully levered; and a controller adapted for controlling said engine in response to an electric signal output from said limit switch, thereby maximizing the number of revolutions of the engine.

3. The matching device according to claim 2, wherein said controlling means further includes:

engine detecting means for detecting the number of revolutions of said engine; and a proportional valve controlling the amount of output fluid of a main hydraulic pump; and said controlled controls the proportional valve and said main hydraulic pump in response to a signal output from said engine detecting means, thus either transmitting all of the output power of said engine to the travelling unit and thereby moving the construction vehicle at a maximum travelling speed in the case of a highest number of revolutions of said engine or reducing the travelling speed of the construction vehicle when the number of revolutions of said engine is reduced due to a travelling resistance.

4. The matching device according to claim 2, wherein said controlling means further includes:

an engine stepping motor selectively fully operating the throttle valve of the engine in response to an electric signal output from said limit switch, thereby maximizing the output power of the engine.

* * * * *